Patented June 8, 1954

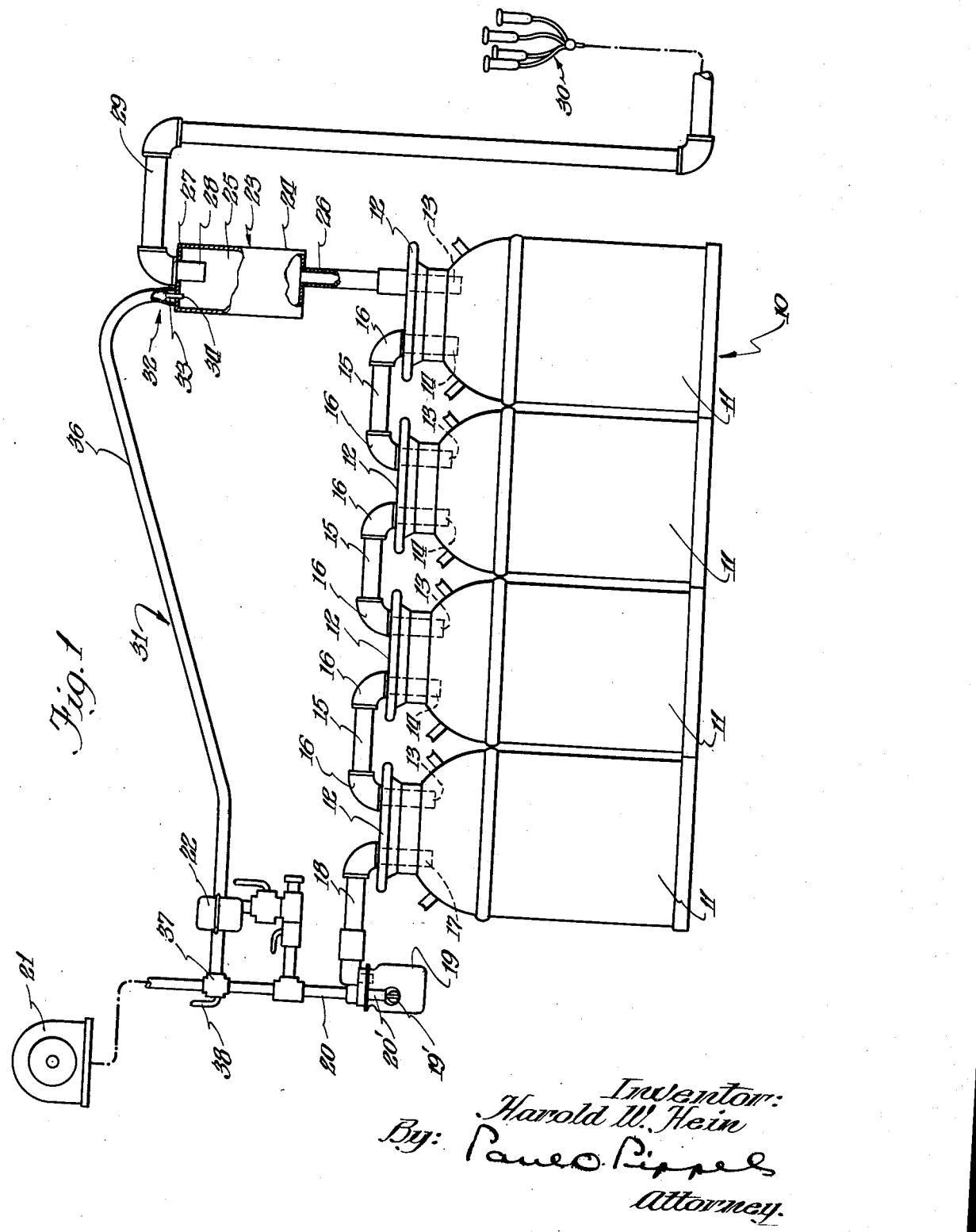

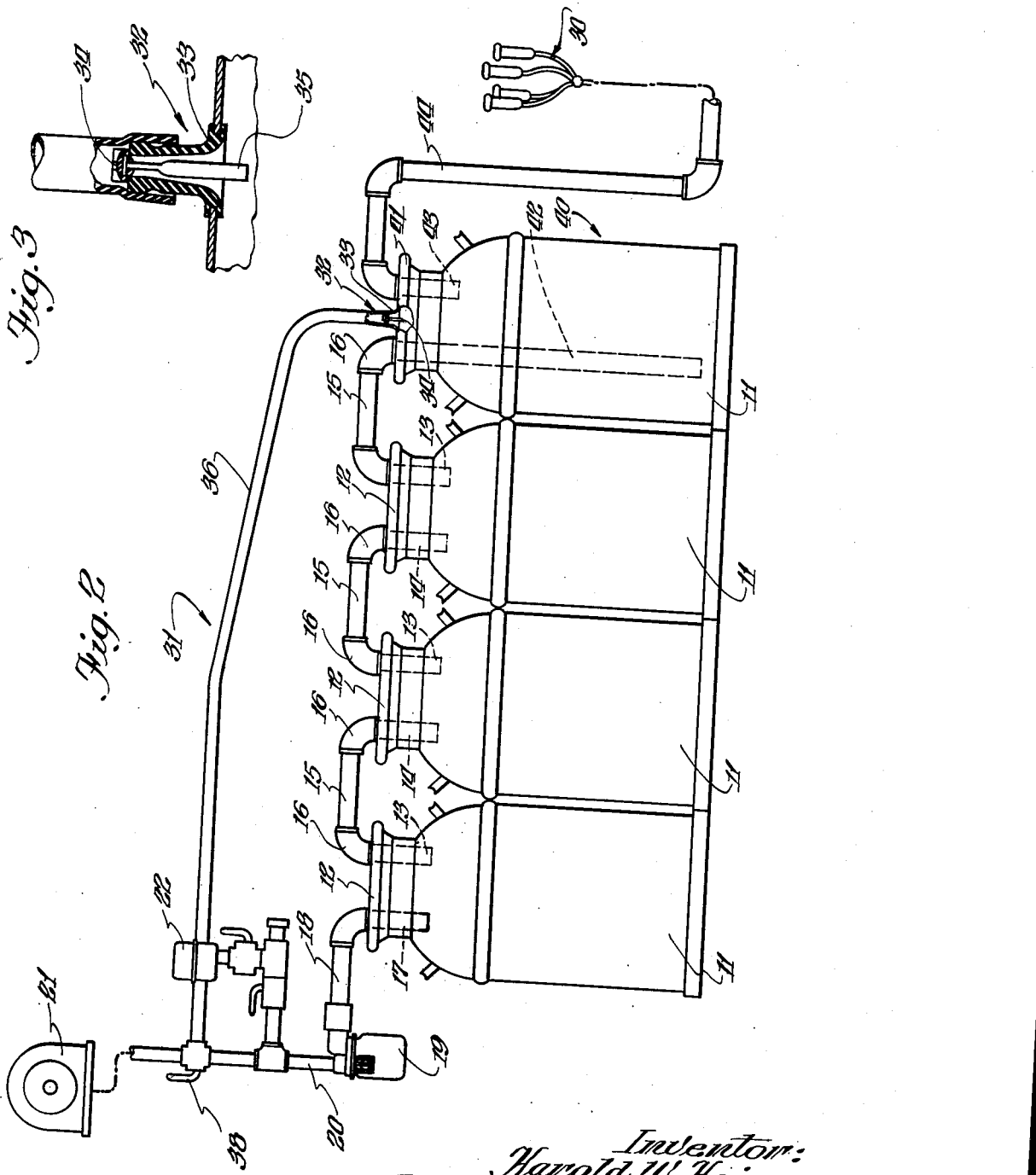

2,680,553

UNITED STATES PATENT OFFICE 2,680,553

PRESSURE EQUALIZING DEVICE FOR CONTINUOUS MILK DELIVERY SYSTEMS

Harold W. Hein, Chicago, Ill., assignor to International Harvester Company, a corporation of New Jersey Application October 28, 1950, Serial No. 192,770

5 Claims. (Cl. 226—116)

This invention relates to a continuous milk delivery system which is adapted to fill a sereis of milk cans as the milk is taken from the animals. More specifically, the invention relates to a pressure equalizing device for a continuous milk delivery system.

The use of pipeline milking systems is becoming more prominent in the dairy industry. In systems of this type the milk is taken directly from the animals and delivered through a pipeline to a plurality of cans which may be connected in series. In series filling of this type, each can is provided with an inlet and outlet tube, the outlet tube of a preceding can being connected to the inlet tube of a succeeding can. The last can of the series is connected to a source of vacuum and thus a vacuum depression is provided in all of the cans. The milk flows into the first can and when the first can has been filled, it flows into the second can and so on until all of the cans of the series have been filled.

In a system of the type above described, as the milk flows through the various pipe connections from one can to another, the milk has a tendency to create a block or blocking factor in the system which causes the vacuum in the system to drop and vary, thereby hindering the normal milking operation which takes place at the animal. In this system the degree of vacuum, which exists in the cans, also exists at the teat cup cluster and within the inflation.

It is generally known that in vacuum milking it is very desirable to maintain a steady and continuous vacuum. Thus any variations which may occur due to blocks created by the milk as it goes through the connecting conduits of the cans cause an uneven operation in the milking. It is the prime object of this invention therefore to provide an equalizing unit or device which is designed to facilitate the filling of the milk cans in a manner wherein milk blocking does not occur.

It is another object to provide a vacuum equalizing unit for a milking system comprising a series of interconnected cans, the unit being connected to the first receiving can of the series and being effective to maintain a constant vacuum on the milk line leading to a teat cup cluster, despite the occurrence of a milk block in the connecting conduits between the cans resulting in a vacuum drop in the system ahead of the milk block.

In the above type of milking system, it has also been found that an undesirable amount of turbulence may be created as the milk flows from one can to another. This may result from the fact that a certain amount of air is present in this system, and when this air is sucked through the system by the vacuum, the velocity of the air in connection with the milk flow will cause a certain amount of turbulence. This turbulence is undesirable since it may create globules of butterfat and otherwise provide an uneven milk quality. It is therefore another object to provide a pressure equalizing unit that will remove excessive air from the milk filling system.

These and further objects will become more clearly apparent from the reading of the specification when taken in connection with the accompanying sheets of drawings.

In the drawings:

Fig. 1 shows a preferred embodiment of a continuous milk delivery system, the system being shown in elevation and certain elements of this system having portions broken away to better illustrate the invention;

Fig. 2 is a modified type of milk delivery system showing a certain embodiment of the invention; and Fig. 3 is a sectional view of a vacuum connection forming a portion of a pressure equalizing device that is used in the systems shown in Figures 1 and 2.

Referring to Fig. 1, a continuous milk delivery system is generally designated by the reference character 10. The system comprises a plurality of cans 11, each of which has a can closure or filling head 12 which is suitably connected to each can to seal the cans from the atmosphere. Each filling head 12 is provided with an inlet tube 13 and an outlet tube 14. The outlet tube 14 of a preceding can 11 is connected to the inlet tube 13 of a succeeding can 11 by means of conduits 15 suitably connected to elbows 16.

A vacuum tube 17 provides an outlet on the last can 11 of the series. The vacuum tube 17 is connected to a conduit 18 which is in communication with a trap 19. A vacuum connection 20 is connected to and in communication with the trap 19, the vacuum connection 20 being provided with an extension 20' which extends downwardly into the trap 19. The open end of the extension 20' may be suitably sealed by means of a ball float valve 19' when the liquid level within the trap 19 rises to seat said ball valve against the extension 20'. The vacuum connection 20 is in communication with a vacuum pump or reservoir 21 schematically shown. A vacuum regulator 22 is connected to the vacuum connection 20, the vacuum regulator 22 being of a conventional type and operating in a conventional manner.

A filling device for filling the milk cans is generally designated by the reference character 23. The filling device 23 comprises a container 24 provided with a milk receiving chamber 25. The chamber 25 is in communication with and connected to a conduit 26 which in turn is connected to the first milk inlet connection 13. A top wall 27 of the container 24 supports an inlet tube 28 extending downwardly into the chamber 25. The inlet tube 28 is connected to the conduit 29 which extends to a teat cup cluster 30 positioned at the animal to be milked.

A pressure equalizing device is indicated at 31. The equalizing device 31 includes a vacuum connection 32 in the form of a nipple 33 connected to the top wall 27 of the container 24 and in communication with the chamber 25. A rubber check valve 34 is seated over the upper end of the nipple 33 for normally sealing the same. A weight 35 is connected to the check valve 34 and tends to maintain the valve 34 in sealing relation with respect to the nipple 33, as most clearly illustrated in Fig. 3. A hose or conduit 36 is connected to the nipple 33 and to a T connection 37 in communication with the vacuum connection 20. A shut-off cock 38 is also connected to the T 37 and can function in a usual manner.

During the operation, milk from the teat cup cluster 30 flows through the pipeline 29 into the chamber 25. The cans 11 are all subjected to a vacuum depression since they are in communication with the vacuum connection 20. Milk flows down into the container 24 and downwardly through the conduit 26 into the first can 11 of the series. When the first can has been filled, milk flows through the outlet 14 of the first can through the inlet 13 into the succeeding can until the said can is filled. Milk continues to flow in this manner until the last can in the series is filled, whereupon overflow into the trap 19 causes the valve 19' to shut off the vacuum by seating itself against the open end extension 20'. Thus the system is shut off and operation ceases.

During normal operation when there are no blockages in the system the check valve 34 is held in a closed position by the weight 35 combined with the vacuum existing in the cans 11 and in the container 24 as against the pulling action of the vacuum in the conduit 36. When, however, a milk block occurs in any one of the conduits 15, there is a drop in the vacuum pressure in the system which is ahead of the block and in the container 24 and thus the check valve 34 will now be moved upwardly from its seat and the container 24 will be maintained under the same vacuum depression that exists in the system when there are no blockages present. Thus since the same primary source of vacuum is used the pressure equalizing device maintains a constant and consistent vacuum pressure at a point which is ahead of the can connections so that any blocking in the can connections does not affect the vacuum pressure at the point of milking. The pressure equalizing device is also effective to remove any excess of air which is drawn in with the milk and since this air is withdrawn before it reaches the can and the can connections, turbulence is greatly decreased and thus the chances of butterfat globules forming are also greatly minimized.

Throughout the specification and claims the phrases "first can of the series" and "last can of the series" are used. The "last can of the series" in both the preferred embodiment and in the modification refers to the can which precedes and is directly connected to the trap 19. The "first can of the series" in the preferred embodiment refers to the first can following the container 24. The "first can of the series" in the modification refers to the can 11 immediately following the can 40 and in direct communication therewith.

The modification shown in Fig. 2 is generally quite similar to the structure shown in Fig. 1. Consequently, the reference characters to like parts of both systems are the same. In Fig. 2 the arrangement has been made to omit the separate container 24 and the first can of the series is connected in a manner to achieve the same function that the container 24 normally would supply. The filling device in this modification therefore is generally referred to by the reference character 40 which describes a can of similar shape as cans 11 of the system. The can 40 is provided with a can closure head 41 suitably sealing said can. A milk outlet 42 is connected by means of a conduit 15 to the inlet 13 of the first can of the series to be filled. The milk outlet 42 extends downwardly into the can 40 adjacent to the bottom of said can. A milk inlet 43 projects through the closure head into the can 40, this inlet being connected to the conduit 44 which is in communication with the teat cup cluster 30. The pressure equalizing device 31 is the same as described in the above description of the preferred embodiment. The vacuum connection 32 is the same, in this case the said connection being connected to the can closure head 41 of the can 40.

Te operation of the device shown in Fig. 2 is the same as that shown in Fig. 1. Milk flows into the can 40 through the inlet 43 and is thereupon carried to the first can 11 of the series through the milk outlet 42. During normal operation when there are no blockages in the system the check valve 34 on the can 40 is held in a closed position due to the weight 35 when combined with the vacuum existing in the can 40 and in the cans 11 which exert a pulling action to maintain the valve 34 on its seat. When, however, a milk block occurs in any one of the conduits 15 or connections 16, there is a drop in the vacuum pressure in that part of the system which is ahead of the block. Since the vacuum drops in the container 40 therefore the check valve 34 is pulled upwardly from its seat almost simultaneously with the vacuum drop and thus the vacuum pressure is quickly again brought up to the desired degree so that the pressure at the teat cup cluster is maintained. The equalizing device 31 also serves to remove any excess of air which may enter into the system at the teat cup cluster. When the blockage of milk clears itself, the valve 34 again resumes its closed position and normal operation continues.

It can now be seen that a milking and filling system has been described which will accomplish the stated objects of the invention. The pressure equalizing device 31 is effective to overcome any deficiencies in a system of this type which might be caused by blocking of the milk and subsequent drop or variations in the vacuum pressure.

It must be understood that changes and further modifications may be made which do not depart from the spirt of the invention as disclosed nor the scope thereof as defined in the appended claims.

What is claimed is:

1. A milk delivery system for successively filling a series of cans to a predetermined level comprising a plurality of cans, a filling head on each can, a milk inlet tube carried by each filling head, a milk outlet tube carried by each filling head except the last filling head of the series, means connecting the milk outlet tube of one filling head with the milk inlet tube of a succeeding filling head, a first vacuum connection connected to the last can of the series for providing a first source of minus pressure in all of the cans of said series, a filling device connected to the inlet tube of the first can of the series, said filling device including a container having a chamber in continual communication with said cans of the series, a milk inlet connection connected to the upper portion of said container and projecting downwardly into said chamber, said milk inlet connection being adapted to connect to a milk line of a milking system, a second vacuum connection on said container in communication with said first vacuum connection and adapted to communicate with said chamber, said second vacuum connection including an automatically operable check valve opening outwardly of the chamber and responsive to a greater vacuum in said second vacuum connection than in said chamber whereby said second vacuum connection and said chambers are in communication, and a vacuum line connecting said second vacuum connection with said first vacuum connection.

2. A milk delivery system for successively filling a plurality of cans to a predetermined level comprising a plurality of cans, an inlet tube on each can, an outlet tube on each can, means connecting the outlet tube of one can to the inlet tube of a succeeding can, a first vacuum connection connected to the outlet tube of the last can, a source of vacuum communicating with the first vacuum connection to provide a vacuum depression within said cans, a milk filling arrangement for said cans including means continuously connecting inlet tube of the first can to a source of milk, a second vacuum connection including a conduit connected to said first vacuum connection at one end and to the first can at its other end, and an automatically operable check valve for said conduit, said check valve opening outwardly of said last can, said check valve being simultaneously movable in response to a greater vacuum in said conduit than in said cans to place said conduit in communication with said first can and said milk filling arrangement during the pressure differential between said cans and said conduit.

3. A milk delivery system for successively filling a series of cans to a predetermined level comprising a plurality of cans, an inlet tube on each can, an outlet tube on each can, means connecting the inlet tube of one can to the outlet tube of the next can of the series, a vacuum line connected to the outlet tube of the last can of the series for providing a vacuum depression within said cans, a milk filling arrangement for said cans, said filling arrangement including a milk receiving chamber, means continuously connecting said receiving chamber to the inlet tube of said first can, a vacuum connection connected to said chamber, a conduit connected to said vacuum connection and to said first vacuum line, an automatically operable check valve on said second vacuum connection, said check valve opening outwardly of said receiving chamber, said valve being movable in response to a greater vacuum in said conduit than in said cans to provide for communication between the conduit and the chamber, and means connecting said chamber to a milk line to provide for the continuous flow of milk to said cans during the milking operation.

4. A milk delivery system for successively filling a series of cans to a predetermined level comprising a plurality of cans, an inlet tube on each can, an outlet tube on each can, means connecting the inlet tube of one can to the outlet tube of the next can of the series, a vacuum line connected to the outlet tube of the last can of the series for providing a vacuum depression within said cans, a milk filling arrangement for said cans, said filling arrangement including a milk receiving chamber, means continuously connecting said receiving chamber to the inlet tube of said first can, a vacuum conduit connected to said chamber, said conduit being connected to said vacuum line, an automatically operable check valve in said conduit opening outwardly of said chamber, said check valve being simultaneously responsive to a greater vacuum in said conduit than in said chambers to open and place said conduit in communication with said chamber, and means connecting said chamber to a source of milk for constantly drawing milk into said chamber.

5. A milk delivery system in accordance with claim 4, wherein the milk receiving chamber is positioned above the first can of the series.

References Cited in the file of this patent
UNITED STATES PATENTS

| Number | Name | Date |
|---|---|---|
| 2,037,467 | Hapgood | Apr. 14, 1936 |
| 2,380,771 | McDonald | July 31, 1945 |
| 2,498,401 | Duncan | Feb. 21, 1950 |